(12) United States Patent
Honma et al.

(10) Patent No.: US 11,108,738 B2
(45) Date of Patent: Aug. 31, 2021

(54) COMMUNICATION APPARATUS AND COMMUNICATION SYSTEM

(71) Applicant: ALAXALA Networks Corporation, Kanagawa (JP)

(72) Inventors: Kazuaki Honma, Kawasaki (JP); Keigo Uchizumi, Kawasaki (JP)

(73) Assignee: ALAXALA NETWORKS CORPORATION, Kawasaki (JP)

( * ) Notice: Subject to any disclaimer, the term of this patent is extended or adjusted under 35 U.S.C. 154(b) by 287 days.

(21) Appl. No.: 16/419,035

(22) Filed: May 22, 2019

(65) Prior Publication Data

US 2020/0036682 A1    Jan. 30, 2020

(30) Foreign Application Priority Data

Jul. 24, 2018 (JP) .............................. JP2018-138085

(51) Int. Cl.
*H04L 29/06* (2006.01)
*H04L 29/12* (2006.01)

(52) U.S. Cl.
CPC ...... *H04L 63/0236* (2013.01); *H04L 61/2015* (2013.01); *H04L 61/2517* (2013.01); *H04L 61/6022* (2013.01); *H04L 63/101* (2013.01)

(58) Field of Classification Search
CPC .................................................. H04L 63/0236
USPC ........................................................... 726/2
See application file for complete search history.

(56) References Cited

U.S. PATENT DOCUMENTS

| | | | |
|---|---|---|---|
| 6,282,575 B1* | 8/2001 | Lin ........................ | H04L 45/00 709/221 |
| 6,779,118 B1* | 8/2004 | Ikudome ................. | H04L 29/06 726/14 |
| 7,249,175 B1* | 7/2007 | Donaldson ........... | G06Q 10/107 709/206 |
| 7,908,645 B2* | 3/2011 | Varghese .............. | G06F 21/552 726/4 |
| 9,049,221 B1* | 6/2015 | Yen ....................... | G06F 16/951 |
| 10,984,068 B2* | 4/2021 | Holloway ............. | H04L 67/146 |
| 2007/0022211 A1* | 1/2007 | Shimizu ................ | H04L 61/103 709/238 |
| 2007/0061458 A1* | 3/2007 | Lum .................... | H04L 61/2015 709/225 |
| 2008/0134300 A1* | 6/2008 | Izatt ....................... | H04L 63/10 726/4 |
| 2009/0165132 A1* | 6/2009 | Jain ........................ | G06F 21/51 726/22 |

(Continued)

FOREIGN PATENT DOCUMENTS

| | | |
|---|---|---|
| JP | 2007-036374 A | 2/2007 |
| JP | 2015-050767 A | 3/2015 |

(Continued)

*Primary Examiner* — Ondrej C Vostal
(74) *Attorney, Agent, or Firm* — Mattingly & Malur, PC (57) ABSTRACT

A whitelist generation possibility/impossibility determination unit transmits a signal for permitting generation of a whitelist to a whitelist generating unit, in a case where an IP address corresponding to a source MAC address stored in a protocol information table matches the extracted source IP address, and in a case where an IP address corresponding to a destination MAC address stored in the protocol information table matches the extracted destination IP address.

13 Claims, 8 Drawing Sheets

| COMMAND TYPE ~1201 | SETTING CONTENT ~1202 | INITIAL STATE ~1203 |
|---|---|---|
| SET WHITELIST FUNCTION STATE | GENERATION STATE/ OPERATION STATE | OPERATION STATE ~1204 |

(56) References Cited

U.S. PATENT DOCUMENTS

| | | | | |
|---|---|---|---|---|
| 2013/0247149 | A1* | 9/2013 | Sanft | H04L 63/0876 |
| | | | | 726/4 |
| 2015/0067764 | A1* | 3/2015 | Kim | H04L 63/101 |
| | | | | 726/1 |
| 2016/0036838 | A1* | 2/2016 | Jain | H04L 63/1416 |
| | | | | 726/23 |
| 2016/0080319 | A1* | 3/2016 | Steele | G06Q 30/018 |
| | | | | 709/228 |
| 2016/0373405 | A1* | 12/2016 | Miller | H04L 63/0236 |
| 2017/0063861 | A1* | 3/2017 | Uchizumi | H04L 63/0236 |
| 2018/0176186 | A1* | 6/2018 | Chao | H04L 63/1408 |
| 2018/0183798 | A1* | 6/2018 | Wang | H04L 63/101 |
| 2018/0262533 | A1* | 9/2018 | McCaig | H04L 63/1408 |
| 2019/0068643 | A1* | 2/2019 | Locke | H04L 63/1425 |
| 2019/0068650 | A1* | 2/2019 | Castel | H04L 63/205 |
| 2019/0230126 | A1* | 7/2019 | Kumar | H04L 45/64 |
| 2020/0036682 | A1* | 1/2020 | Honma | H04L 63/0236 |

FOREIGN PATENT DOCUMENTS

| | | | | |
|---|---|---|---|---|
| JP | 2017-046149 A | | 3/2017 | |
| WO | WO-2017073089 A1 * | | 5/2017 | H04L 41/0873 |

* cited by examiner

| MAINTENANCE INFORMATION | MAINTENANCE CONTENT | INITIAL STATE |
|---|---|---|
| WHITELIST FUNCTION STATE | GENERATION STATE/ OPERATION STATE | OPERATION STATE |

FIG. 9

COMMUNICATION APPARATUS AND COMMUNICATION SYSTEM

CROSS-REFERENCE TO RELATED APPLICATION

The present application claims priority from Japanese application JP 2018-138085, filed on Jul. 24, 2018, the contents of which is hereby incorporated by reference into this application.

BACKGROUND OF THE INVENTION

1. Field of the Invention

The present invention relates to a communication apparatus and a communication system.

2. Description of the Related Art

In recent years, it is needed to take measures to prevent an attacker from invading a network in a critical infrastructure such as a power plant and prevent a system from being controlled by the attacker. In the network of the critical infrastructure, protection measures are performed using virus software and the like mounted on a terminal such as a firewall apparatus and a personal computer. However, more powerful measures are needed to prevent the attacker who intends to control the system from invading the system.

As a method of reducing a risk when being attacked by the attacker, there is a method of using a whitelist function by a communication apparatus. The whitelist function by the communication apparatus is a function of registering information of a normal terminal included in normal communication flowing in the network in the communication apparatus capable of accommodating the whitelist, and blocking abnormal communication from other terminals than the normal terminal registered in the communication apparatus capable of accommodating the whitelist, thereby increasing a level of security. For example, JP 2015-050767 A and JP 2017-046149 A disclose a method of utilizing such a whitelist function.

Also, another security technology is a security technology in a network using a DHCP. Such a security technology is disclosed, for example, in JP 2007-36374 A. Specifically, in JP 2007-36374 A, once an IP address of a DHCP packet matches an IP address of an ARP packet, port filtering is performed on a client terminal that has transmitted the ARP packet.

According to JP 2007-36374 A, in a network in which an IP address is assigned using the DHCP, when an abnormal terminal is connected, a port of a transfer apparatus is blocked to block communication, thereby preventing connection of the abnormal terminal. However, by using the method of JP 2007-36374 A alone, it is not possible to perform communication control by capturing suspicious behavior of a normal terminal as in the whitelist function.

On the other hand, as described in JP 2015-050767 A and JP 2017-046149 A, there are a case where the whitelist is set in advance by an administrator and a case where the whitelist is automatically generated from contents in communication. However, in a case where the whitelist is automatically generated from contents in communication, the whitelist is generated for packets received in a generation state, without distinction between normal communication and abnormal communication. For this reason, in a case where an abnormal terminal is connected in the generation state, communication related to the abnormal terminal is also registered in the whitelist.

In a case where a network to which the whitelist function is applied is relatively closed as in a factory or important infrastructure, and connected equipment is also a stationary network, connection of the abnormal terminal in the generation state is easy to be eliminated by physical means and the like.

However, for example, when it is attempted to apply the whitelist function to a network with increased flexibility in connection of a physical terminal by dynamic IP address assignment technology such as DHCP, as in an office environment, there is a problem of dealing with connection of the abnormal terminal in the generation state. In such a case, it is difficult to improve security by the whitelist function.

SUMMARY OF THE INVENTION

An object of the present invention is to improve security by a whitelist function in a network in which terminal IP addresses change dynamically.

According to an aspect of the present invention, there is provided a communication apparatus for relaying a packet received according to a whitelist including a MAC address and an IP address, including: a protocol information table that stores the MAC address and the IP address in association with each other; a whitelist generating unit that generates the whitelist; a whitelist storage memory that stores the whitelist; and a whitelist generation possibility/impossibility determination unit that determines whether or not generation of the whitelist is possible, in which the whitelist generation possibility/impossibility determination unit extracts a source MAC address, a source IP address, a destination MAC address, and a destination IP address, from contents in communication between a server and a client terminal according to a protocol for dynamically assigning the IP address, and in which, in a case where the protocol information table is searched based on the extracted source MAC address, and the IP address corresponding to the source MAC address stored in the protocol information table matches the extracted source IP address, and in a case where the protocol information table is searched based on the extracted destination MAC address, and the IP address corresponding to the destination MAC address stored in the protocol information table matches the extracted destination IP address, the whitelist generation possibility/impossibility determination unit transmits a signal for permitting generation of the whitelist to the whitelist generating unit.

According to an aspect of the present invention, there is provided a communication apparatus for relaying a packet received according to a whitelist including a MAC address and an IP address, including: a protocol information table that stores the MAC address and the IP address in association with each other; a whitelist generating unit that generates the whitelist; a whitelist storage memory that stores the whitelist; and a whitelist generation possibility/impossibility determination unit that determines whether or not generation of the whitelist is possible, in which the whitelist generation possibility/impossibility determination unit extracts a source MAC address, a source IP address, a destination MAC address, and a destination IP address, from contents in communication between a server and a client terminal according to a protocol for dynamically assigning the IP address, and in which, in a case where the protocol information table is searched based on the extracted source IP address, and the MAC address corresponding to the source IP address stored in the protocol information table matches the extracted source MAC address, and in a case where the protocol information table is searched based on the extracted destination IP address, and the MAC address corresponding to the destination IP address stored in the protocol information table matches the extracted destination MAC address, the whitelist generation possibility/impossibility determination unit transmits a signal for permitting generation of the whitelist to the whitelist generating unit.

According to an aspect of the present invention, in a network in which terminal IP addresses change dynamically, it is possible to improve security by the whitelist function.

DETAILED DESCRIPTION OF THE PREFERRED EMBODIMENTS

Hereinafter, an embodiment will be described with reference with the drawings.

First Embodiment

Figure 1:
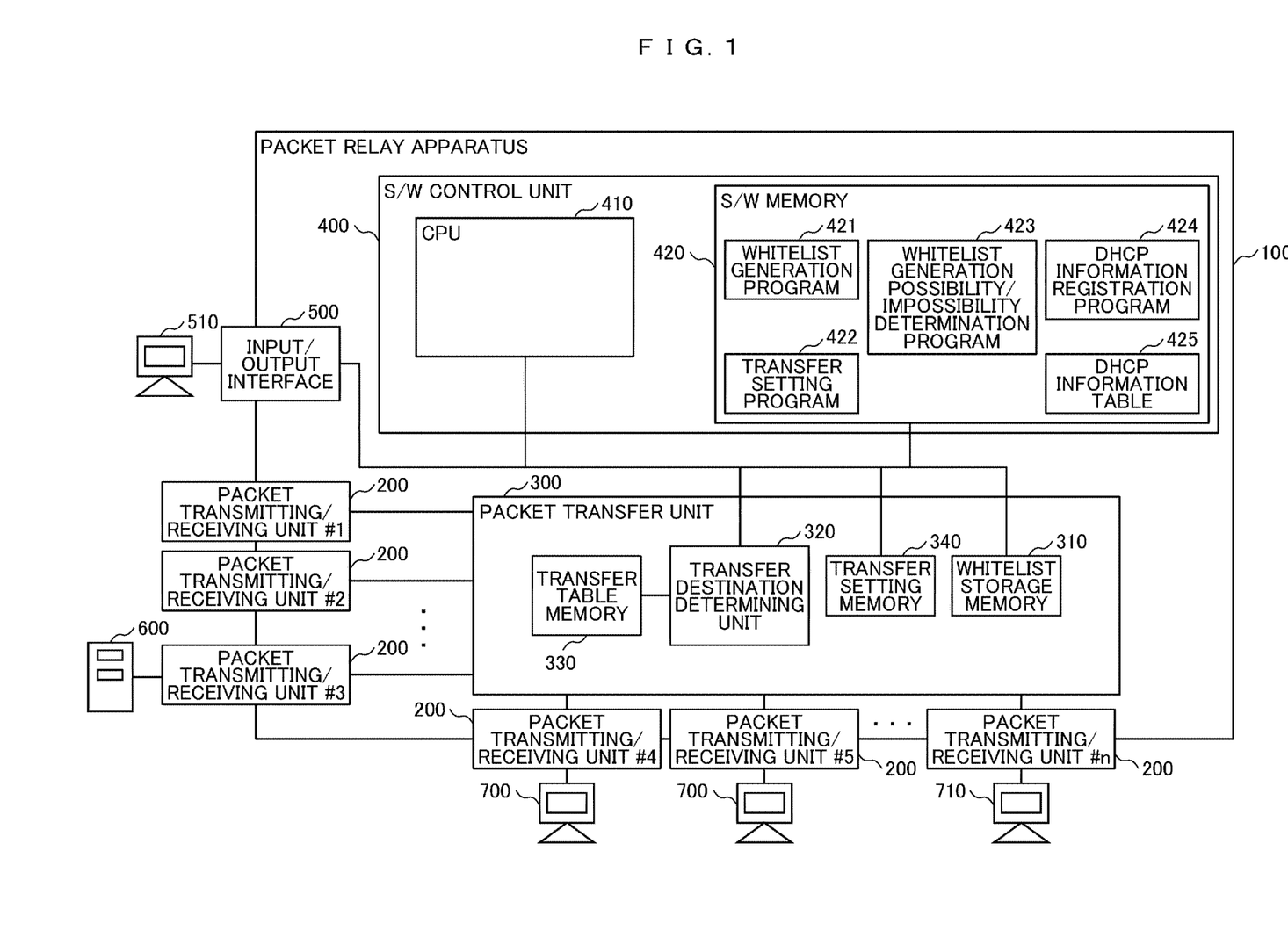
FIG. 1 is a block diagram illustrating a configuration example of a packet relay apparatus, and a DHCP server and a DHCP client connected to the packet relay apparatus.

The communication apparatus and the communication system according to the first embodiment will be described with reference to FIG. 1. FIG. 1 illustrates a configuration example of a packet relay apparatus 100 relaying a packet which is an example of data, and a DHCP server 600 and a DHCP client 700 connected to the packet relay apparatus 100.

The packet relay apparatus 100 is an example of a communication apparatus. For example, the packet relay apparatus 100 executes packet relay, whitelist generation possibility/impossibility determination, generation of the whitelist, and generation of a DHCP information table 425 from communication by a DHCP exchanged between the DHCP server 600 and the DHCP client 700. The whitelist indicates a list of packets for which the packet relay apparatus 100 permits to be transferred. Incidentally, for example, the DHCP is specified by RFC2131 without being limited thereto.

The packet relay apparatus 100 includes, for example, a plurality of packet transmitting/receiving units 200, a packet transfer unit 300, a Software (S/W) control unit 400, and an input/output interface 500.

Each of the packet transmitting/receiving units 200 is connected to an external apparatus such as a terminal or another packet relay apparatus, by a wire such as a metal cable or an optical cable or by wireless. Then, a packet is received from a connected external apparatus, and the received packet is transmitted to a connected external apparatus. The packet transmitting/receiving unit 200 includes a transmitting/receiving unit number that uniquely identifies the packet transmitting/receiving unit 200.

When each packet is received, the packet transmitting/receiving unit 200 adds control information corresponding to the packet transmitting/receiving unit 200 to the packet. The control information includes, for example, a packet transmitting/receiving unit number of the packet transmitting/receiving unit 200 and a VLAN number which is a VLAN identifier to which the packet transmitting/receiving unit 200 belongs.

For example, the packet transfer unit 300 receives a packet from the packet transmitting/receiving unit 200, and transfers or discards the received packet according to the whitelist generated by the S/W control unit 400. For example, the S/W control unit 400 executes whitelist generation possibility/impossibility determination, generation of the whitelist, and generation of the DHCP information table 425 from communication by the DHCP exchanged between the DHCP server 600 and the DHCP client 700.

An input/output apparatus 510 is connected to the input/output interface 500. The input/output interface 500 receives an input from a user through the input/output apparatus 510. Also, the input/output interface 500 outputs an execution result of a program and the like, to the input/output apparatus 510. For example, the input/output apparatus 510 includes an input apparatus that receives an input from the user such as a keyboard or a mouse, and an output apparatus that outputs a processing result of the packet relay apparatus 100 such as a display apparatus or a printer in a format visually recognizable by the user.

Incidentally, although the input/output apparatus 510 in FIG. 1 is described as an apparatus independent of the packet relay apparatus 100, the input/output apparatus 510 such as a display or an operation button may be disposed on the packet relay apparatus 100.

The DHCP server 600 is a server for assigning an IP address to the DHCP client 700 by the DHCP, and is connected to the packet relay apparatus 100 by the packet transmitting/receiving unit 200.

The DHCP client 700 is a terminal for receiving an IP address assignment to be serviced by the DHCP, and is connected to the packet relay apparatus 100 by the packet transmitting/receiving unit 200. Incidentally, the packet transmitting/receiving unit 200 to which the DHCP client 700 is connected has a transmitting/receiving unit number different from that of the packet transmitting/receiving unit 200 to which the DHCP server 600 is connected.

A client 710 having a static IP Address is a terminal that does not receive an IP address assignment to be serviced by the DHCP, and is connected to the packet relay apparatus 100 by the packet transmitting/receiving unit 200. Incidentally, the packet transmitting/receiving unit 200 to which the client 710 having a static IP Address is connected has a transmitting/receiving unit number different from that of the packet transmitting/receiving unit 200 to which the DHCP server 600 and the DHCP client 700 are connected.

The packet transfer unit 300 includes a whitelist storage memory 310, a transfer destination determining unit 320, a transfer table memory 330, and a transfer setting memory 340. For example, the whitelist storage memory 310 is a Content Addressable Memory (CAM), a Dynamic Random Access Memory (DRAM), or the like, and stores a whitelist generated by the S/W control unit 400.

For example, the transfer table memory 330 is a CAM, a DRAM, or the like, and stores information indicating a correspondence between header information of a packet and a transfer destination of the packet, that is, the packet transmitting/receiving unit 200. The information is generated by an administrator or the like and stored in the transfer table memory 330 in advance. A Mac Address Table used for communication of a layer 2 of an Open Systems Interconnection (OSI) reference model, or a Routing Table used for communication of a layer 3 of the OSI reference model are examples of information indicating the correspondence.

For example, the transfer setting memory 340 is a DRAM or the like, and stores setting information such as a mode and a state of the packet relay apparatus 100 to be described later and operations at the time of receiving a packet that has not been registered in the whitelist. The setting information stored in the transfer setting memory 340 is set by an administrator or the like through the input/output apparatus 510.

The transfer destination determining unit 320 receives a packet from the packet transmitting/receiving unit 200, and searches the transfer table memory 330 using the header information of the received packet as a key to determine the transfer destination of the received packet.

Also, in a case where a packet is received in a whitelist operation state to be described later, the transfer destination determining unit 320 searches the whitelist stored in the whitelist storage memory 310. In a case where it is determined that the received packet is a packet that has not been registered in the whitelist, transfer destination determining unit 320 discards the packet.

Once a packet is received in a whitelist generation state to be described later, the transfer destination determining unit 320 extracts predetermined header information and predetermined control information from the received packet, and transmits the extracted header information and the predetermined control information to the S/W control unit 400. The transfer destination determining unit 320 determines whether or not to perform communication using the whitelist, and the like, according to the setting content of the transfer setting memory 340. Also, when a DHCP ACK packet to be described later is received, information of the DHCP client 700 is extracted from the packet and transmitted to the S/W control unit 400.

The packet transfer unit 300 may be usually configured by hardware in order to simply execute high-speed commands such as high-speed searching in the whitelist and communication at a wire rate of packets. For example, the packet transfer unit 300 may be configured with a Field Programmable Gate Array (FPGA) or the like. The packet transfer unit 300 may be configured by software.

The S/W control unit 400 includes a Control Processing Unit (CPU) 410 and a S/W memory 420. The CPU 410 includes a processor that executes a program stored in the S/W memory 420. The S/W memory 420 may include a Read Only Memory (ROM) which is a non-volatile storage element and a Random Access Memory (RAM) which is a volatile storage element. The ROM stores an unchangeable program (for example, a Basic Input/Output System (BIOS)), and the like. The RAM is a high-speed volatile memory element such as a DRAM, and temporarily stores a program executed by the processor and data used when the program is executed.

The S/W memory 420 includes a whitelist generation program 421, a transfer setting program 422, a whitelist generation possibility/impossibility determination program 423, a DHCP information registration program 424 and a DHCP information table 425.

The program stored in the S/W memory 420 is executed by the CPU 410 (processor) to perform predetermined processing using a storage device, a communication port (communication device), and the like. Therefore, in the first embodiment, the description with the program as the subject may be the description with the CPU 410 (processor) as the subject. Alternatively, processing executed by the program is processing executed by a computer and a computer system on which the program operates.

The CPU 410 (processor) operates as a functional unit that implements a predetermined function by operating according to the program. For example, the CPU 410 (processor) functions as a whitelist generating unit by operating according to the whitelist generation program 421, functions as a transfer setting unit by operating according to the transfer setting program 422, functions as a whitelist generation possibility/impossibility determination unit by operating according to the whitelist generation possibility/impossibility determination program 423, and functions as a DHCP information registration unit by operating according to the DHCP information registration program 424. The DHCP information table 425 is generated from information input by the administrator or the like through the DHCP information registration program 424 and the input/output apparatus 510.

Furthermore, the CPU 410 (processor) also operates as a functional unit that implements each of a plurality of processes executed by each program. Incidentally, the S/W control unit 400 (in particular, the CPU 410) and the packet transfer unit 300 (in particular, the transfer destination determining unit 320) may be referred to as a processing unit.

Once a packet is received in the whitelist generation state to be described later, the whitelist generation program 421 generates a whitelist from the control information and the header information that have been received from the transfer destination determining unit 320, and writes the whitelist into the whitelist storage memory 310, in a case where the whitelist generation possibility/impossibility determination program 423 to be described later permits generation of the whitelist.

Also, in a case where an entry registered in the DHCP information table 425 is updated or deleted in a whitelist generation state, a change notification of the DHCP information table 425 is received from the DHCP information registration program 424. Then, according to the information in the change notification, the information registered in the whitelist storage memory 310 is updated and deleted.

The transfer setting program 422 writes the transfer setting input from the input/output apparatus 510 into the transfer setting memory 340. Once a packet is received in the whitelist generation state, the whitelist generation possibility/impossibility determination program 423 acquires a source IP address, a source MAC address, a destination IP address, and a destination MAC address, from the control information and the header information that have been received from the transfer destination determining unit 320. Then, the DHCP information table 425 is searched with the acquired source MAC address and in a case where a MAC address exists, an IP address registered in the entry is compared with the acquired source IP address.

If the IP addresses are the same as a result of the comparison, the DHCP information table 425 is searched with the acquired destination MAC address. Then, in a case where a MAC address exists, an IP address registered in the entry is compared with the acquired destination IP address. If IP addresses are the same as a result of the comparison, a signal for permitting the whitelist generation of the received packet is transmitted to the whitelist generation program 421.

If the acquired information on the source MAC address and destination MAC address does not exist in the DHCP information table 425, or if the compared IP addresses are different, a signal for permitting the whitelist generation of the received packet is not transmitted to the whitelist generation program 421.

Incidentally, as for an order in which the whitelist generation possibility/impossibility determination program 423 searches the DHCP information table 425, the search for the destination MAC address may be performed first, and also for a search key, if the combination of the source MAC address and the source IP address, and the destination MAC address and the destination IP address exists, the source IP address and the destination IP address may be used as the search key.

From DHCP communication exchanged between the DHCP server 600 and the DHCP client 700, the DHCP information registration program 424 extracts a combination of an IP address assigned to the DHCP client 700 by the DHCP server 600 and a MAC address of the DHCP client 700, and a lease timer for the IP address. Then, the DHCP information table 425 is searched using the MAC address of the DHCP client 700 as a key. If there is no entry related to the MAC address of the DHCP client 700 in the DHCP information table 425, the DHCP information registration program 424 generates a new entry in the DHCP information table 425 and stores the generated information.

If there is already an entry for the MAC address of the DHCP client 700 in the DHCP information table 425, the DHCP information registration program 424 updates the DHCP information table 425 using the information extracted from the IP address information and the lease timer.

Incidentally, as for the lease timer, a remaining time is subtracted from a timing when the information is stored, and the deletion processing of the entry to be described later is performed at a timing when the remaining time becomes zero.

Also, in a case where an entry in the DHCP information table 425 is updated or the entry is deleted, the change notification of the DHCP information table 425 is transmitted to the whitelist generation program 421. The change notification includes information of the entry before and after updating when the update is performed, and information of the deleted entry when the deletion is performed.

Figure 2:
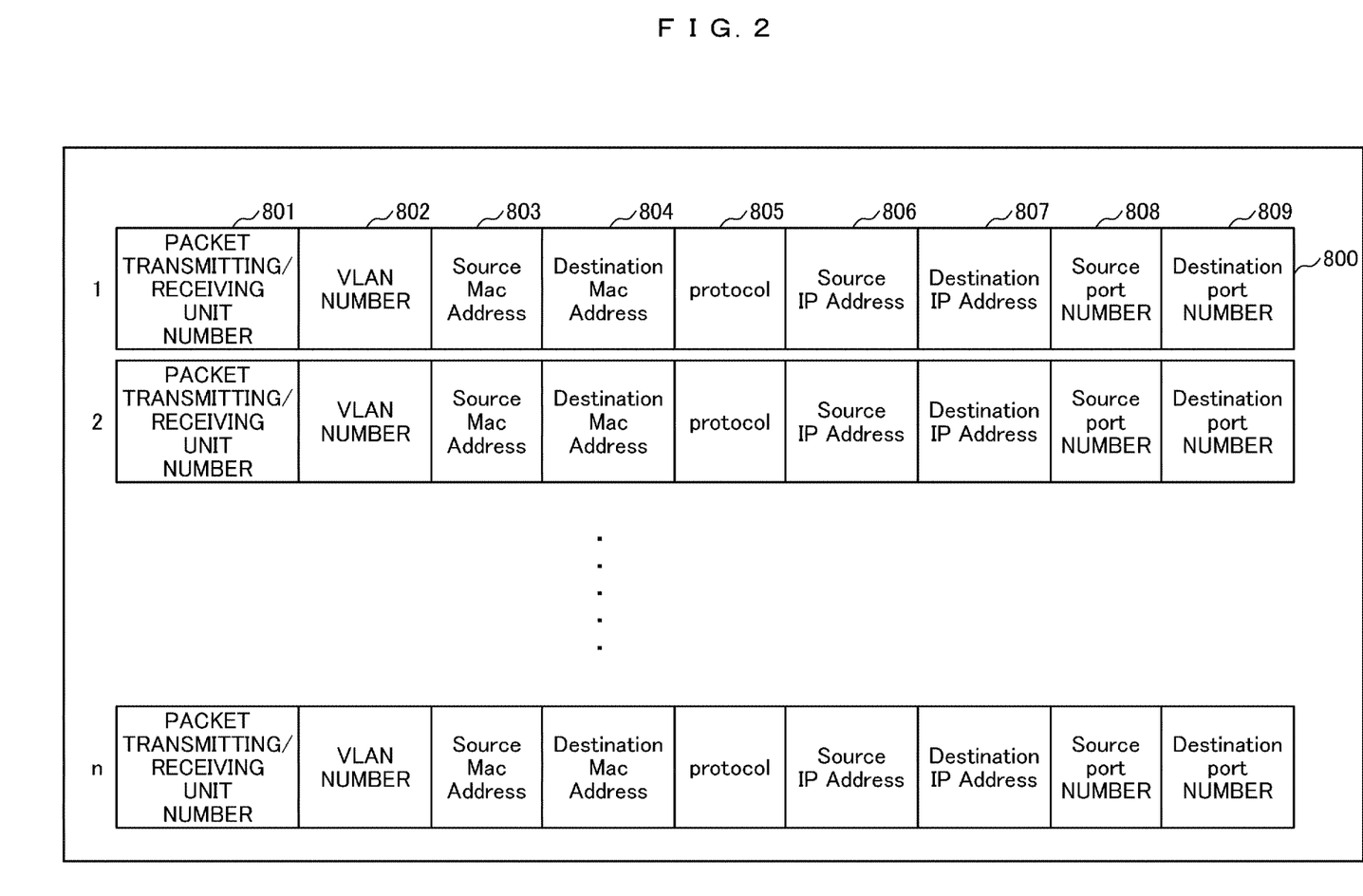
FIG. 2 is a diagram illustrating an example of a whitelist and whitelist storage memory internal information.

An example of the whitelist stored in the whitelist storage memory 310 will be described with reference to FIG. 2. In the example of FIG. 2, the whitelist includes n entries. Each entry in the whitelist contains a plurality of parameters. Each of the plurality of parameters is control information or header information extracted by the transfer destination determining unit 320 from the packet received from the packet transmitting/receiving unit 200.

An entry 800 is an example of an entry included in the whitelist. For example, the entry 800 includes a packet transmitting/receiving unit number 801 and a VLAN number 802 which are parameters indicating the control information of each packet. For example, the entry 800 includes a Source Mac Address 803, a Destination Mac Address 804, a Protocol 805, a Source IP Address 806, a Destination IP Address 807, a Source port number 808, and a Destination port number 809 which are parameters indicating the header information of each packet.

The packet transmitting/receiving unit number 801 is a number for uniquely identifying each of the packet transmitting/receiving units 200. The packet transmitting/receiving unit 200 which has received the packet is specified by the packet transmitting/receiving unit number 801. The VLAN number 802 is a number for uniquely identifying the VLAN to which the packet transmitting/receiving unit 200 belongs.

The Source Mac Address 803 indicates a source Mac address of the packet. The Destination Mac Address 804 indicates a destination Mac address of the packet. The protocol 805 indicates a type of protocol. The Source IP Address 806 indicates a source IP address of the packet. The Destination IP Address 807 indicates a destination IP address of the packet. The Source port number 808 indicates a source port number of the packet. The Destination port number 809 indicates a destination port number of the packet.

Incidentally, the entry 800 is not limited to the example of the parameters 801 to 809 in FIG. 2, but may include a parameter indicating one or more types of control information and a parameter indicating a plurality of types of header information including the Source IP Address 806 and the Destination IP Address 807. For example, the entry 800 may include header information such as a Type Of Service (TOS), a flag, a Time To Live (TTL), an ID, a version, and a header value in addition to or instead of the parameters indicating header information to be described later.

An example of information stored in the DHCP information table 425 will be described with reference to FIG. 3.

Figure 3:
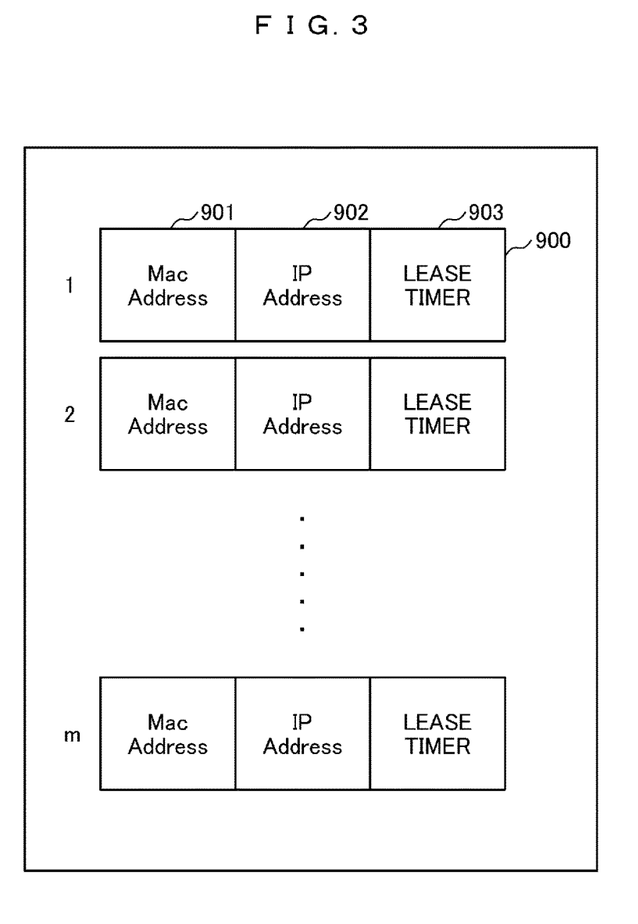
FIG. 3 is a diagram illustrating an example of a DHCP information table.

In the example of FIG. 3, the DHCP information table 425 includes m entries. Each entry of the DHCP information table 425 includes a plurality of parameters. Each of the plurality of parameters is information extracted from the DHCP ACK packet that has been received by the transfer destination determining unit 320 from the DHCP server 600 through the packet transmitting/receiving unit 200. The DHCP ACK packet includes a MAC address of the DHCP client 700 that assigns an IP address, the IP address assigned to the DHCP client 700, and a lease timer for the IP address.

Incidentally, the lease timer is information to be preset in a DHCP ACK packet when the DHCP server 600 sends out the DHCP ACK packet. An entry 900 is an example of an entry included in the DHCP information table 425. The Mac Address 901 is a MAC address of the DHCP client 700 that assigns an IP address included in the DHCP ACK packet. The IP Address 902 is the IP address assigned to the DHCP client 700 included in the DHCP ACK packet. The lease timer 903 stores an expiration date for the IP address.

Also, each of the plurality of parameters may be written by the administrator or the like from the input/output apparatus 510 through the input/output interface 500, and the client 710 having a static IP Address, which does not receive an IP address assignment to be serviced by the DHCP, may also be registered in the DHCP information table 425.

Figure 4:
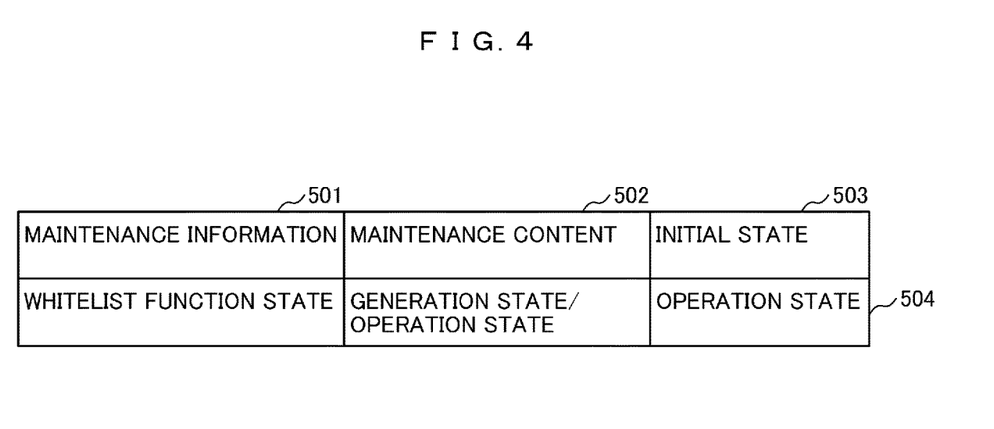
FIG. 4 is a diagram illustrating an example of setting information maintained by a transfer setting memory.

An example of transfer setting information maintained by the transfer setting memory 340 will be described with reference to FIG. 4.

For example, the transfer setting information includes maintenance information 501 indicating a type of transfer setting, a maintenance content 502 indicating a state of the maintenance information 501, and an initial state 503 indicating an initial state of the maintenance content 502. In FIG. 4, a plurality of values divided by "/" are described in each cell indicating the maintenance content 502, but in practice, any one of the plurality of values is stored. The initial state 503 stores any one of the plurality of values described in the corresponding maintenance content 502.

Hereinafter, a schematic example of the operations of the packet relay apparatus 100 according to the transfer setting information will be described.

Upon receiving the packet, the transfer destination determining unit 320 determines whether the maintenance content 502 of a record 504 corresponds to a generation state in which generation of the whitelist is performed, or an operation state in which communication control by the whitelist is performed.

Hereinafter, an operation example in a case where the maintenance content 502 of the record 504 corresponds to the generation state will be described.

In a case where the packet received from the packet transmitting/receiving unit 200 is a packet other than a DHCP packet, the transfer destination determining unit 320 transmits the predetermined header information and the predetermined control information of the received packet, to the whitelist generation program 421 and the whitelist generation possibility/impossibility determination program 423, while transferring the packet similarly to a normal packet relay apparatus.

The whitelist generation possibility/impossibility determination program 423 extracts a source MAC address, a source IP address, a destination MAC address, and a destination IP address from the predetermined header information and the predetermined control information of the packet that has been received from the transfer destination determining unit 320. Then, the DHCP information table 425 is searched with the extracted source MAC address. In a case where the MAC address is registered, an IP address registered in the entry is compared with the extracted destination IP address. Then, in a case where IP addresses are the same, the DHCP information table 425 is searched with the extracted destination MAC address. In a case where the MAC address is registered, an IP address registered in the entry is compared with the extracted destination IP address. Then, in a case where IP addresses are the same, a signal for permitting generation of the whitelist is transmitted to the whitelist generation program 421.

In a case where the signal for permitting generation of the whitelist is received from the whitelist generation possibility/impossibility determination program 423, the whitelist generation program 421 extracts whitelist parameters from the header information and the control information (801 to 809) that have been received from the transfer destination determining unit 320, and writes the extracted information into the whitelist storage memory 310.

Also, in the whitelist generation possibility/impossibility determination program 423, in a case where the source MAC address or the destination MAC address, or both of them extracted from the predetermined header information and the predetermined control information of the packet that has been received from the transfer destination determining unit 320 are not registered in the DHCP information table 425, and in a case where, although the extracted source MAC address and destination MAC address have been registered in the DHCP information table 425, the IP address registered in the entry and the extracted IP address are different IP addresses, a signal for permitting generation of the whitelist is neither transmitted to the whitelist generation program 421 nor generation of the whitelist is performed.

Also, in a case where the packet received by the transfer destination determining unit 320 is a DHCP ACK packet, the DHCP information registration program 424 registers an entry in the DHCP information table 425 while transferring the packet similarly to the case of a normal packet relay apparatus, and updates the entry. Also, if, at this time, the entry is updated, the DHCP information registration program 424 transmits a change notification of the entry along with the information before and after the update of the entry, to the whitelist generation program 421.

The whitelist generation program 421 that has received the change notification searches the whitelist storage memory 310 for the information before the update of the entry included in the change notification, and performs the rewriting of the updated information included in the change notification, when a hit occurs as a result of the search. When no hit occurs as a result of the search, the rewriting of the whitelist storage memory 310 is not performed.

Also, in a case where the packet received by the transfer destination determining unit 320 is a DHCP RELEASE packet, the DHCP information registration program 424 deletes an entry from the DHCP information table 425 while transferring the packet similarly to the case of a normal packet relay apparatus. At this time, the DHCP information registration program 424 transmits a change notification of the entry along with the information of the deleted entry, to the whitelist generation program 421. The whitelist generation program 421 that has received the change notification searches the whitelist storage memory 310 for the information of the deleted entry included in the change notification. When a hit occurs as a result of the search, deletion of the hit entry is performed. When no hit occurs as a result of the search, the deletion of the entry in the whitelist storage memory 310 is not performed.

Incidentally, in a case where the lease timer of the entry registered in the DHCP information table 425 becomes zero and deletion processing of the entry is performed, the DHCP information registration program 424 detects deletion of the entry, and transmits a change notification of the entry along with the information of the deleted entry, to the whitelist generation program 421. The whitelist generation program 421 that has received the change notification searches the whitelist storage memory 310 for the information of the deleted entry included in the change notification. When a hit occurs as a result of the search, deletion of the hit entry is performed. When no hit occurs as a result of the search, deletion of the entry in the whitelist storage memory 310 is not performed.

Hereinafter, an operation example in a case where the maintenance content 502 of the record 504 corresponds to the operation state will be described.

In a case where the packet received from the packet transmitting/receiving unit 200 is a packet other than the DHCP packet, the transfer destination determining unit 320 determines whether or not packet information has been registered in the whitelist stored in the whitelist storage memory 310. In a case where the packet information is already registered in the whitelist, for the received packet, the transfer destination determining unit 320 transfers the packet similarly to the case of a normal packet relay apparatus.

In a case where the packet information is not registered in the whitelist, the transfer destination determining unit 320 discards the packet.

Incidentally, in a case where the packet received by the transfer destination determining unit 320 is a packet related to the DHCP, the packet is transferred as a target for searching the whitelist or a target to be unregistered and discarded, regardless of the maintenance content 502 of the record 504.

Figure 5:
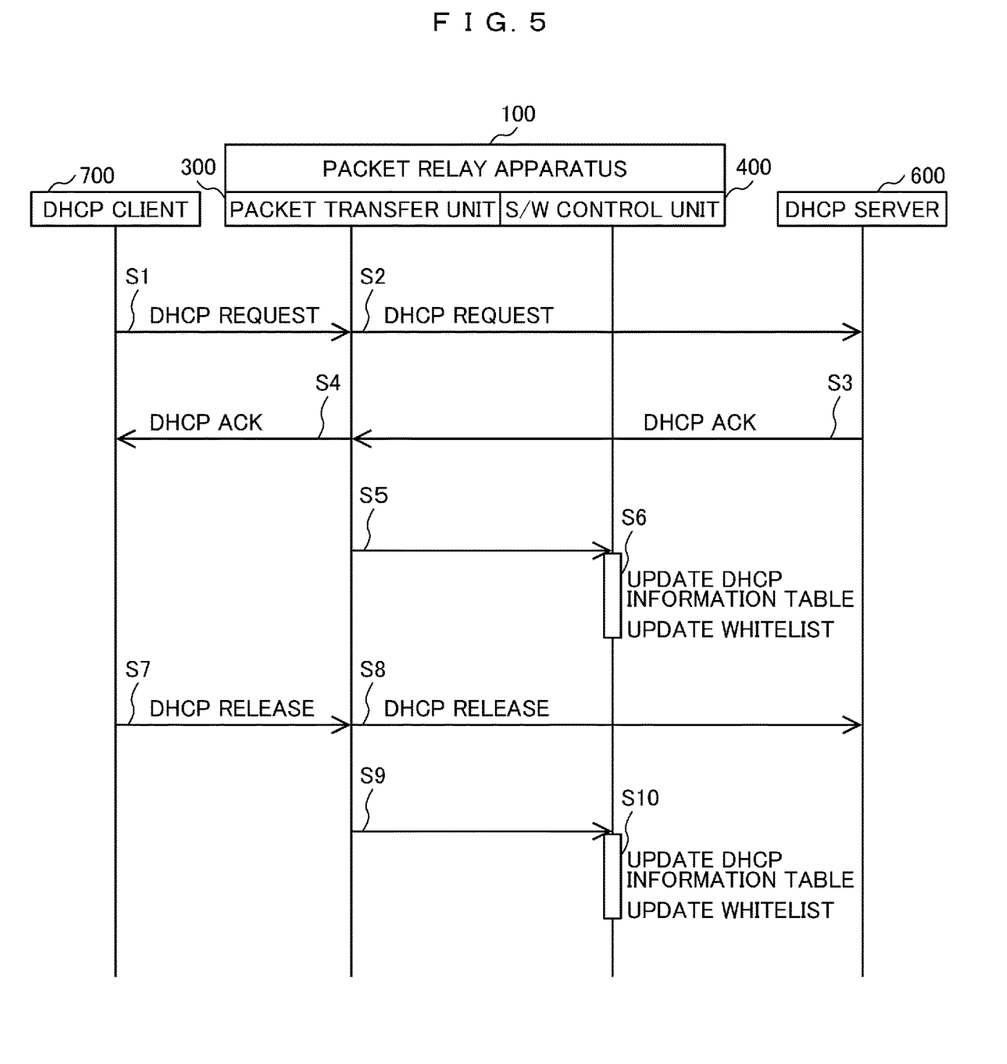
FIG. 5 is an explanatory diagram illustrating an operation in a packet relay apparatus 100 for relaying a packet when communication using a DHCP is performed between a DHCP server 600 and a DHCP client 700.

Operations in the packet relay apparatus 100 for relaying a packet when communication using the DHCP is performed between the DHCP server 600 and the DHCP client 700 will be described with reference to FIG. 5.

Once a DHCP REQUEST packet is sent from the DHCP client 700 at S1 and received by the packet relay apparatus 100, the packet transfer unit 300 transfers the packet at S2. Once the DHCP server 600 that has received the DHCP REQUEST packet from the DHCP client 700 sends out a DHCP ACK packet in S3 and then the DHCP ACK packet is received at the packet relay apparatus 100, the packet transfer unit 300 transfers the packet in S4. Furthermore, the MAC address of the DHCP client 700, the IP address assigned to the DHCP client 700 and the lease timer stored in the DHCP ACK packet are extracted in S5 and transmitted to the S/W control unit 400.

The S/W control unit 400 that has received DHCP information performs registration of the DHCP information into the DHCP information table 425 or update of the DHCP information table 425 in S6. In a case where the processing at this time is the update of the DHCP information table 425, the update of the entry registered in the whitelist storage memory 310 is also performed concurrently.

Also, once a DHCP RELEASE packet is sent from the DHCP client 700 at S7 and received by the packet relay apparatus 100, the packet transfer unit 300 transfers the packet at S8. Furthermore, the information (for example, the MAC address of the DHCP client 700, the IP address assigned to the DHCP client 700, and the like) stored in the DHCP RELEASE packet is extracted in S9 and transmitted to the S/W control unit 400. The S/W control unit 400 that has received the DHCP information deletes an entry registered in the DHCP information table 425 in S10. At this time, deletion of the entry registered in the whitelist storage memory 310 is also performed concurrently.

Figure 6:
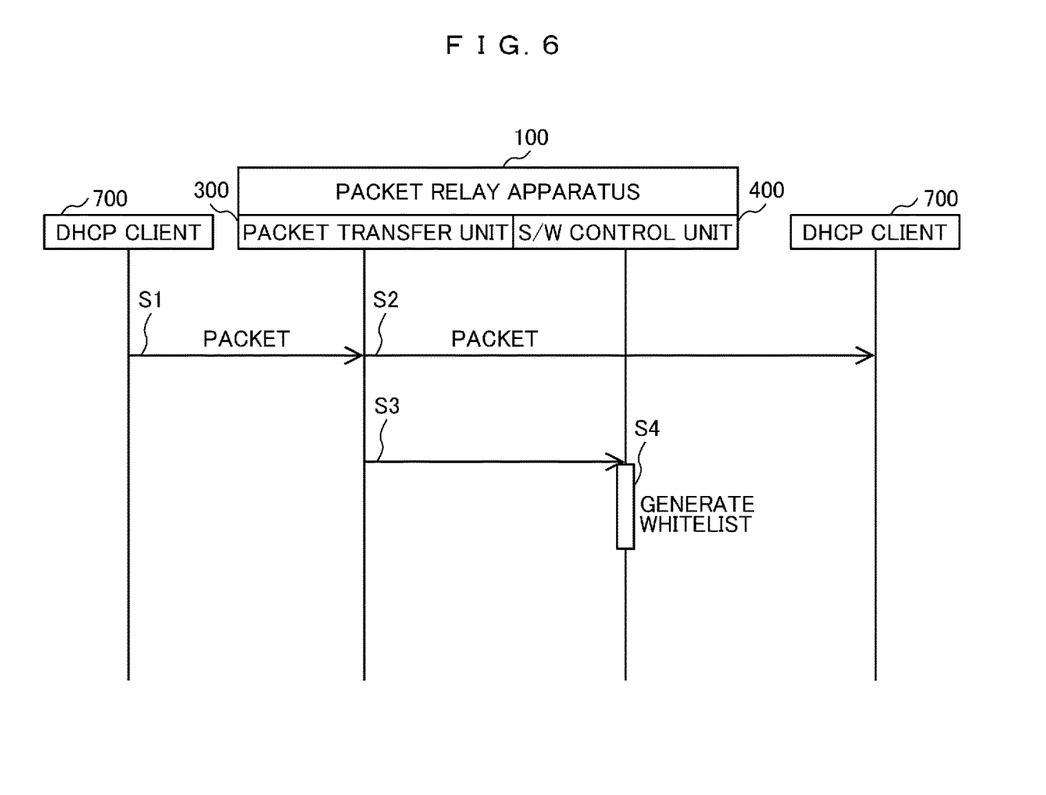
FIG. 6 is an explanatory diagram illustrating an operation when a packet transfer unit of the packet relay apparatus receives a packet.

With reference to FIG. 6, in a case where the maintenance content 502 corresponds to the generation state, when communication is performed between DHCP clients 700 respectively connected to packet transmitting/receiving units 200 having different transmitting/receiving unit numbers, operations in the packet relay apparatus 100 for relaying packets will be described. Incidentally, operations at the time of receiving the packet in FIG. 6 will be separately described with reference to FIGS. 7A to 7C.

Once a packet is sent from the DHCP client 700 at S1 and received by the packet relay apparatus 100, the packet transfer unit 300 transfers the packet at S2. Furthermore, the predetermined header information and the predetermined control information are extracted from the packet received in S3 and transmitted to the S/W control unit 400. The S/W control unit that has received the DHCP information determines whether or not generation of the whitelist is possible in S4, and performs generation of the whitelist, in a case where generation of the whitelist is permitted.

Operations at the time of receiving the packet will be described with reference to FIGS. 7A to 7C. Incidentally, for FIG. 7A to 7C, operations are performed sequentially in the order of FIG. 7A, FIG. 7B, and FIG. 7C as described below.

First, operations when the packet transfer unit 300 of the packet relay apparatus 100 receives a packet will be described with reference to FIG. 7A.

In step 1001, the transfer destination determining unit 320 extracts predetermined header information and predetermined control information within the packet. Thereafter, in step 1002, the transfer destination determining unit 320 transmits the extracted information (for example, MAC address information) to the whitelist generation program 421 and the whitelist generation possibility/impossibility determination program 423.

Next, with reference to FIG. 7B, in the first embodiment, operations when the whitelist generation possibility/impossibility determination program 423 of the packet relay apparatus 100 receives packet information from the packet transfer unit 300 and determines whether or not generation of the whitelist is possible will be described.

In step 1003, the whitelist generation possibility/impossibility determination program 423 extracts a source MAC address, a source IP address, a destination MAC, and a destination IP address from the predetermined header information and the predetermined control information within the packet that has been received from the transfer destination determining unit 320 in step 1003.

In step 1004, the DHCP information table 425 is searched using the extracted source MAC address as a key. In a case where a HIT occurs as a result of the search in step 1005, the whitelist generation possibility/impossibility determination program 423 proceeds to step 1006, and in a case where no HIT occurs, the processing is ended.

In step 1006, the whitelist generation possibility/impossibility determination program 423 compares an IP address registered in the hit entry of the DHCP information table 425 with the extracted source IP address.

In a case where IP addresses are the same as a result of the comparison in step 1007, the whitelist generation possibility/impossibility determination program 423 proceeds to step 1008, and in a case where IP addresses are different, the processing is ended.

In step 1008, the whitelist generation possibility/impossibility determination program 423 searches the DHCP information table 425 using the extracted destination MAC address as a key. In a case where a HIT occurs as a result of the search in step 1009, the whitelist generation possibility/impossibility determination program 423 proceeds to step 1010, and in a case where no HIT occurs, the processing is ended.

In step 1010, the whitelist generation possibility/impossibility determination program 423 compares an IP address registered in the hit entry of the DHCP information table 425 with the extracted destination IP address. In a case where IP addresses are the same as a result of the comparison in step 1011, the whitelist generation possibility/impossibility determination program 423 proceeds to step 1012, and transmits a signal for permitting registration into the whitelist, to the whitelist generation program 421. Also, in a case where the IP addresses are different, the processing is ended.

Incidentally, although, in the first embodiment, the processing of comparing the IP address registered in the entry with the source IP address using the source MAC address as a key (steps 1004 to 1007) and the processing of comparing the IP address registered in the entry with the destination IP address using the destination MAC address as a key (step 1008 to step 1011) are performed sequentially, and these two processings may be performed in parallel or sequentially regardless of an order.

Finally, with reference to FIG. 7C, operations when the whitelist generation program 421 of the packet relay apparatus 100 receives packet information from the packet transfer unit 300 and performs generation of a whitelist will be described.

In step 1013, the whitelist generation program 421 receives the predetermined header information and the predetermined control information within the packet that has been received from the transfer destination determining unit 320.

In step 1014, it is determined from the whitelist generation possibility/impossibility determination program 423 whether or not a signal for permitting registration into the whitelist is received. Then, in a case where the signal for permitting registration into the whitelist is received in step 1015, the processing proceeds to step 1016, in which the whitelist is generated from the predetermined header information and the predetermined control information within the packet that has been received from the transfer destination determining unit 320. In a case where the signal is not received, the processing proceeds to step 1017, and the processing is ended without generating a whitelist.

Figure 7A:
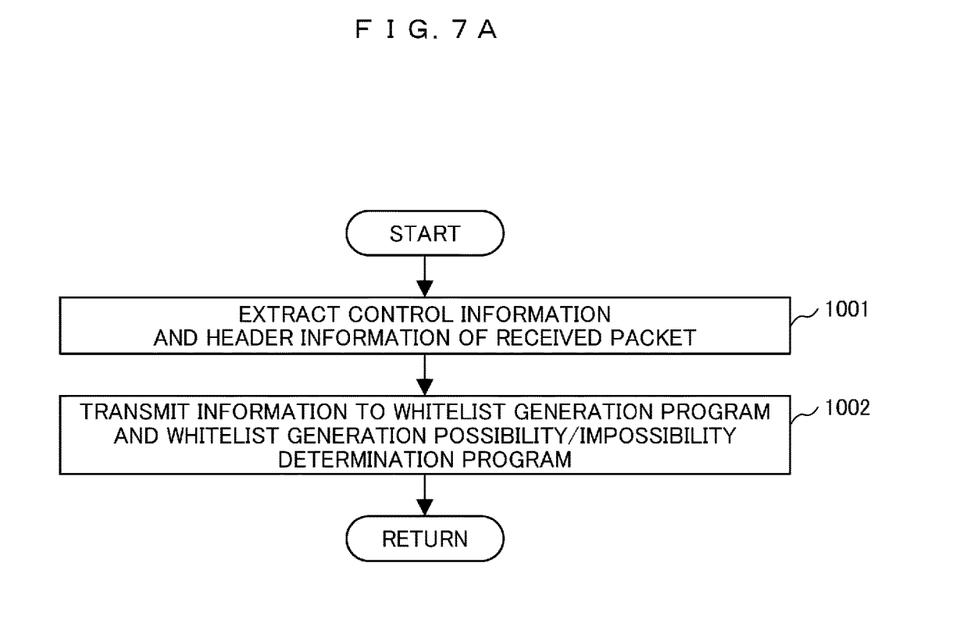
FIG. 7A is a flowchart for describing operations when a packet transfer unit of a packet relay apparatus receives a packet.
Figure 7B:
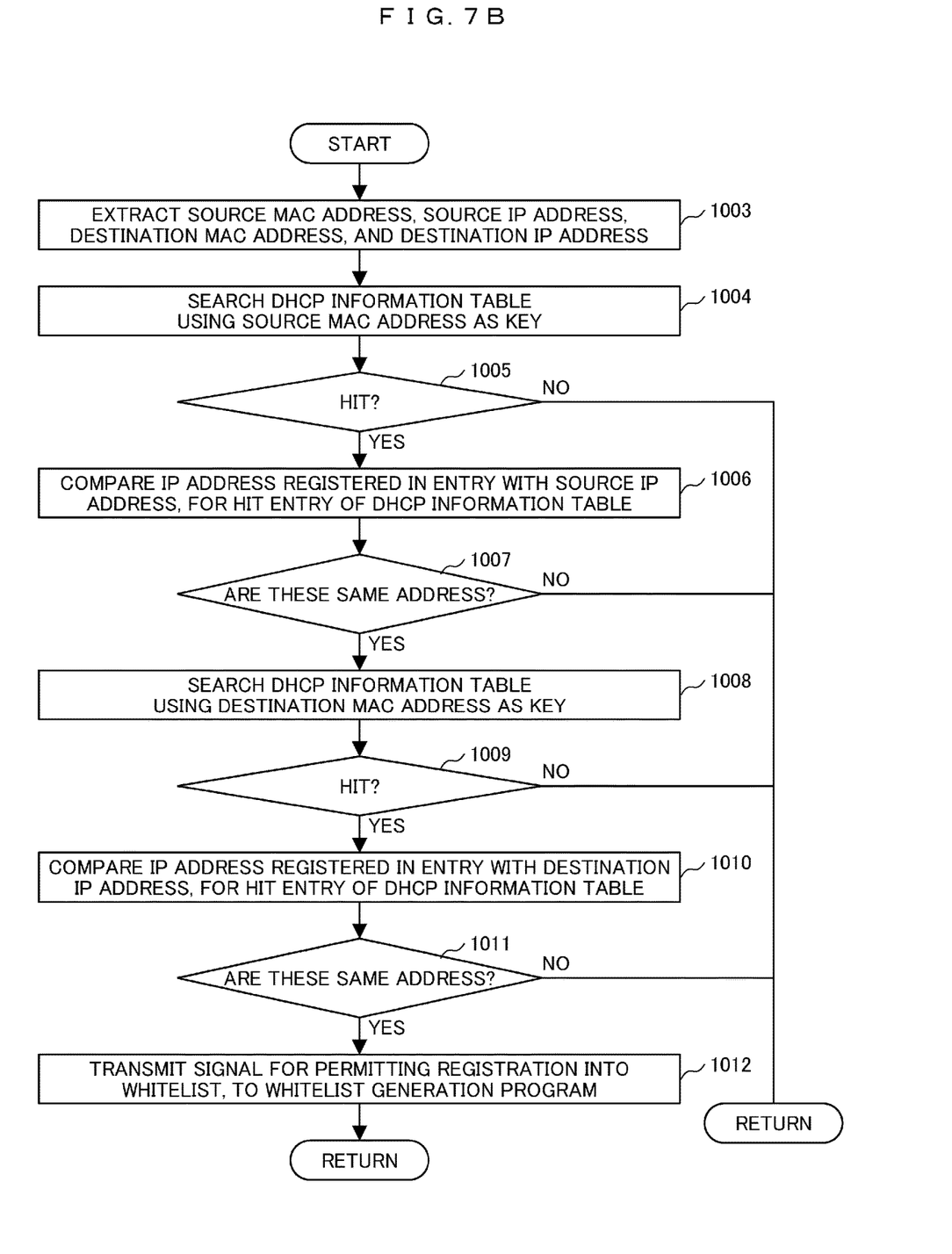
FIG. 7B is a flowchart of a whitelist generation possibility/impossibility determination program of the packet relay apparatus receiving packet information from the packet transfer unit and determining whether or not generation of the whitelist is possible in a first embodiment.
Figure 7C:
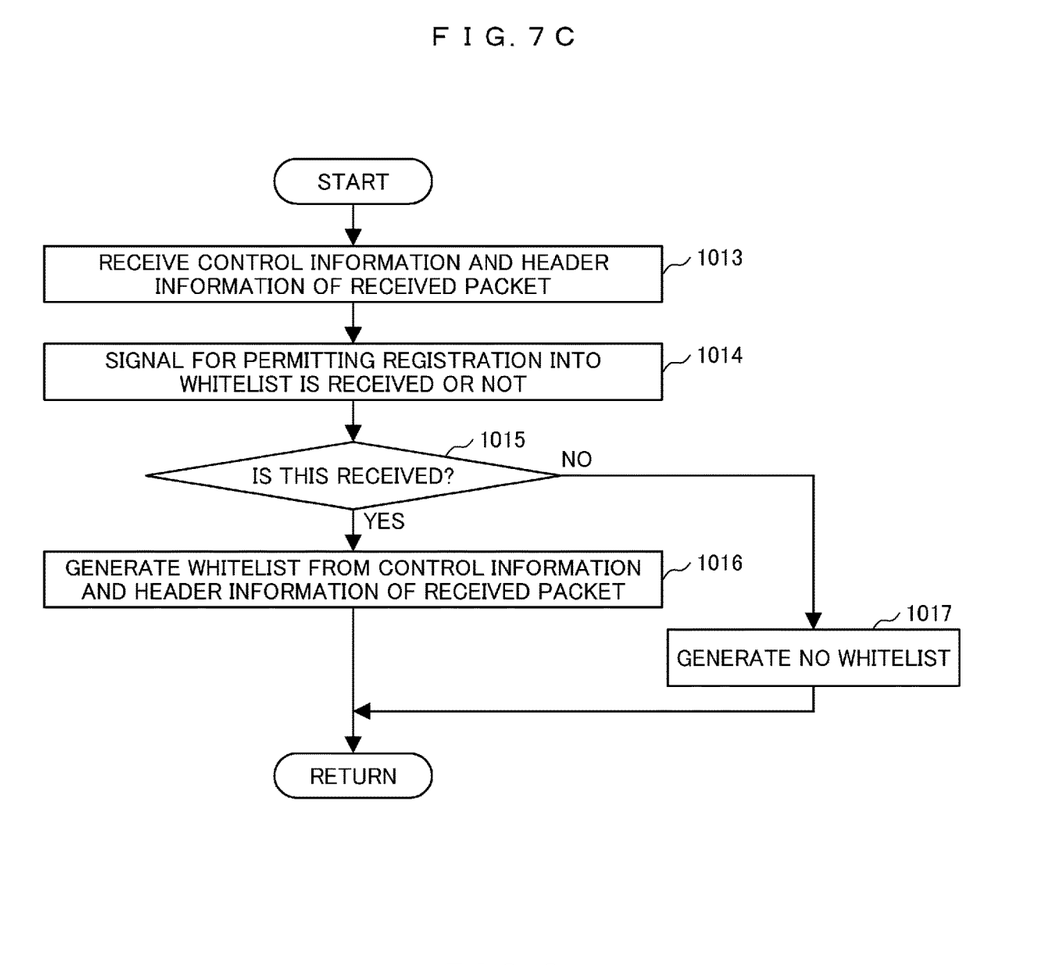
FIG. 7C is a flowchart of the whitelist generation program of the packet relay apparatus receiving packet information from the packet transfer unit and performing generation of the whitelist to be stored in a whitelist storage memory.

Since operations are repeatedly performed in the order of FIG. 7A, FIG. 7B, and FIG. 7C each time a packet is received, it is possible to generate a high-security whitelist in which communication only with highly reliable clients registered in the DHCP information table 425 is permitted.

Figure 8:
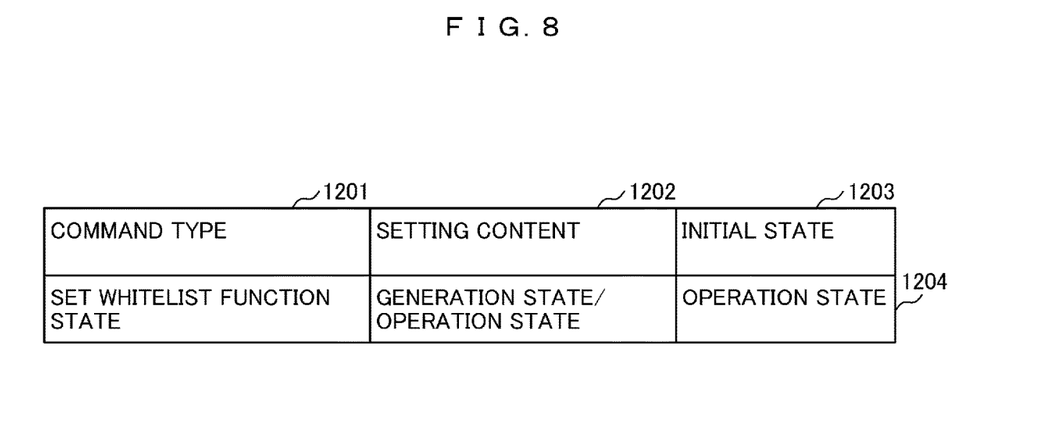
FIG. 8 is a diagram illustrating an example of a command transmitted from an input/output apparatus to a packet relay apparatus.

With reference to FIG. 8, an example of a command related to transfer setting in which the transfer setting program 422 receives an input from the input/output apparatus 510 will be described.

For example, the command related to transfer setting includes a command type 1201 indicating a type of the command, a setting content 1202 indicating a setting content by the command indicated by the command type 1201, and an initial state 1203 indicating an initial state of the setting content 1202.

The command indicated by a record 1204 is a command of changing a transfer setting indicated by the record 504. The command type 1201, the setting content 1202, and the initial state 1203 of the record 1204 correspond to the maintenance information 501, the maintenance content 502, and the initial state 503 of the record 504.

Incidentally, in a case where the transfer setting program 422 accepts, from the input/output apparatus 510, a command of changing a generation state of the whitelist into an operation state thereof, a notification of a fact that the command has been accepted is sent from the transfer setting program 422 to the whitelist generation possibility/impossibility determination program 423 and the whitelist generation program 421. The whitelist generation possibility/impossibility determination program 423 that has received the notification stops the processing of FIG. 7B (or the processing of FIG. 9 to be described later), and the whitelist generation program 421 stops the processing of FIG. 7C.

Also, a command related to a transfer setting in which the transfer setting program 422 receives an input from the input/output apparatus 510 is an example, and for example, it is possible to perform addition, correction, deletion, and the like of an entry on the DHCP information table 425, through the transfer setting program 422.

Second Embodiment

Figure 9:
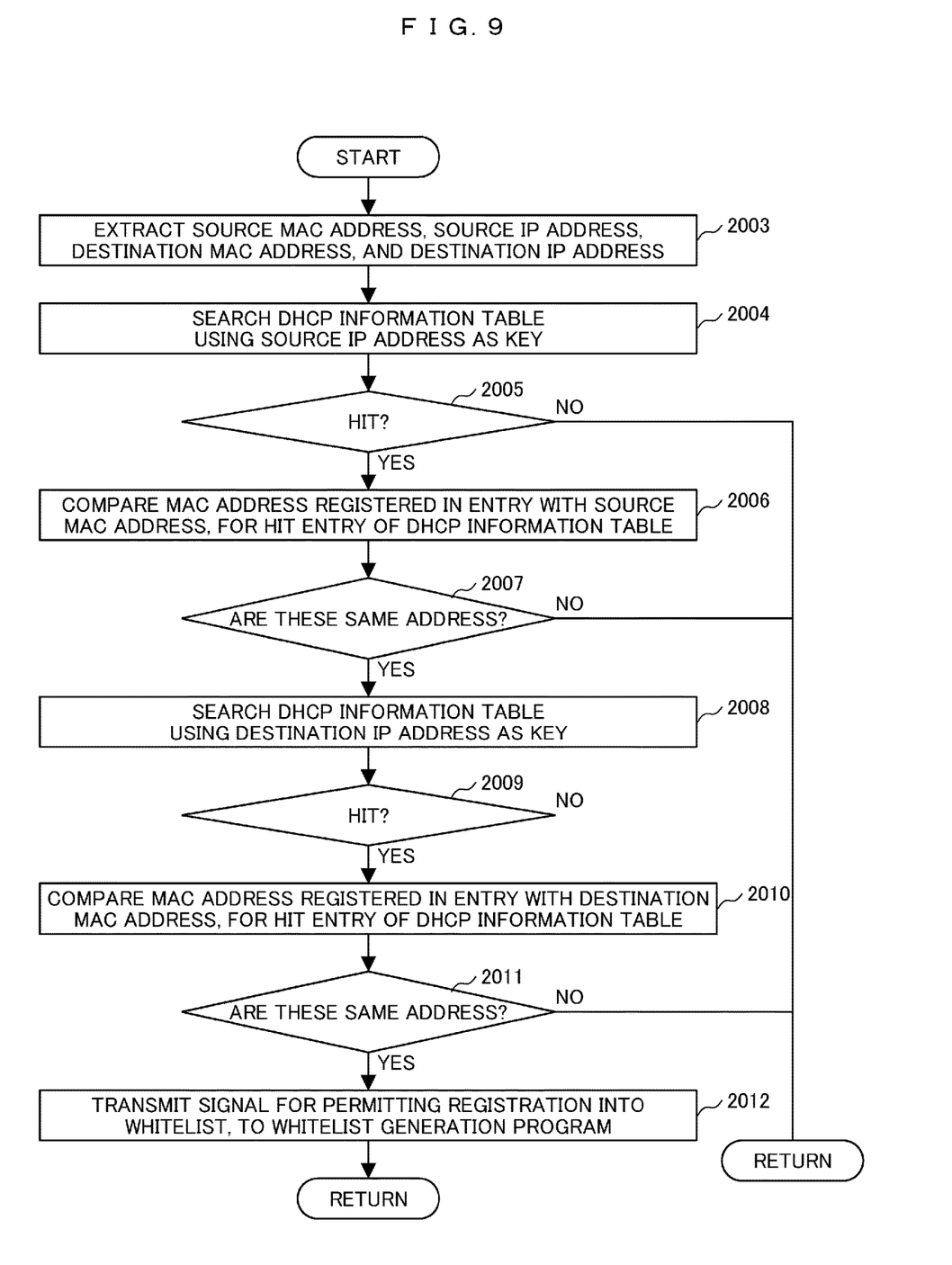
FIG. 9 is a flowchart of a whitelist generation possibility/impossibility determination program of a packet relay apparatus receiving packet information from a packet transfer unit and determining whether or not generation of the whitelist is possible in a second embodiment.

With reference to FIG. 9, in the second embodiment, operations when the whitelist generation possibility/impossibility determination program 423 of the packet relay apparatus 100 receives packet information from the packet transfer unit 300 and determines whether or not generation of the whitelist is possible will be described.

Incidentally, in the first embodiment, as illustrated in FIG. 7B, the DHCP information table 425 is searched using the source MAC address and the destination MAC address as keys. On the other hand, in the second embodiment, as illustrated in FIG. 9, the DHCP information table 425 is searched using the source IP address and the destination IP address as a key. Incidentally, the processing illustrated in FIGS. 7A and 7C may be applied to the second embodiment as it is, and therefore the description thereof will not be repeated.

As illustrated in FIG. 9, in step 2003, the whitelist generation possibility/impossibility determination program 423 extracts a source MAC address, a source IP address, a destination MAC address and a destination IP address from predetermined header information and predetermined control information in the packet that has been received from the transfer destination determining unit 320. In step 2004, the DHCP information table 425 is searched using the extracted source IP address as a key.

In a case where a HIT occurs as a result of the search in step 2005, the whitelist generation possibility/impossibility determination program 423 proceeds to step 2006, and in a case where no HIT occurs, the processing is ended. In step 2006, the whitelist generation possibility/impossibility determination program 423 compares a MAC address registered in the hit entry of the DHCP information table 425 with the extracted source MAC address.

In a case where MAC addresses are the same as a result of comparison in step 2007, the whitelist generation possibility/impossibility determination program 423 proceeds to step 2008, and in a case where MAC addresses are different, the processing is ended.

In step 2008, the whitelist generation possibility/impossibility determination program 423 searches the DHCP information table 425 using the extracted destination IP address as a key, in step 2008. In a case where a HIT occurs as a result of the search in step 2009, the whitelist generation possibility/impossibility determination program 423 proceeds to step 2010, and in a case where no HIT occurs, the processing is ended.

In step 2010, the whitelist generation possibility/impossibility determination program 423 compares a MAC address registered in the hit entry of the DHCP information table 425 with the extracted destination MAC address. In a case where MAC addresses are the same as a result of the comparison in step 2011, the whitelist generation possibility/impossibility determination program 423 proceeds to step 2012, and transmits a signal for permitting registration into the whitelist, to the whitelist generation program 421. Also, in a case where the MAC addresses are different, the processing is ended.

Incidentally, in the second embodiment, the processing of comparing the MAC address registered in the entry with the source MAC address using the source IP address as a key (steps 2004 to 2007) and the processing of comparing the MAC address registered in the entry with the destination MAC address using the destination IP address as a key (step 2008 to step 2011) are performed sequentially, and these two processings may be performed in parallel or sequentially regardless of an order.

Since operations are repeatedly performed in the order of FIG. 7A, FIG. 9, and FIG. 7C each time a packet is received, it is possible to generate a high-security whitelist in which communication only with highly reliable clients registered in the DHCP information table 425 is permitted.

Incidentally, a case where the server receives an address distribution request from the client and the DHCP for dynamically assigning an IP address to the client from the server has been described as an example. However, the present invention is not limited to the DHCP, and is able to use various protocols other than the DHCP as long as it is possible to perform dynamic assignment of an IP address.

What is claimed is:

1. A communication apparatus for relaying a packet received according to a whitelist including a MAC address and an IP address, comprising:
   a protocol information table that stores the MAC address and the IP address in association with teach other;
   a whitelist storage memory that stores the whitelist; and
   a processor configured to:
     generate the whitelist;
     determine whether or not generation of the whitelist is possible,
   wherein the processor extracts a source MAC address, a source IP address, a destination MAC address, and a destination IP address, from contents in communication between a server and a client terminal according to a protocol for dynamically assigning the IP address, and
   wherein, in a case where the protocol information table is search based on the extracted source MAC address, and the IP address corresponding to the source MAC address stored in the protocol information table matches the extracted source IP address, and
   in case where the protocol information table is searched based on the extracted destination MAC address, and the IP address corresponding to the destination MAC address stored in the protocol information table matches the extracted destination IP address,
   the processor transmits a signal for permitting generation of the whitelist.

2. The communication apparatus according to claim 1, wherein the processor performs generation of the whitelist, in a case where a signal for permitting generation of the whitelist is received.

3. The communication apparatus according to claim 2, wherein the processor does not perform generation of the whitelist, in a case where a signal for permitting generation of the whitelist is not received.

4. The communication apparatus according to claim 1, further comprising:
   a control unit that generates the protocol information table from content in communication according to the protocol exchanged between the server and the client terminal.

5. The communication apparatus according to claim 1, wherein, once the packet is received in the whitelist generation state in which generation of the whitelist is performed, the processor generates the whitelist and writes the whitelist into the whitelist storage memory, in a case where generation of the whitelist is permitted.

6. The communication apparatus according to claim 5, wherein the processor performs update of the whitelist stored in the whitelist storage memory, in a case where the protocol information table is updated in the whitelist generation state in which generation of the whitelist is performed.

7. A communication apparatus for relaying a packet received according to a whitelist including a MAC address and an IP address, comprising:
   a protocol information table that stores the MAC address and the IP address in association with each other;
   a whitelist storage memory that stores the whitelist; and
   a processor configured to:
     generate the whitelist;
     determine whether or not generation of the whitelist is possible,
   wherein the processor extracts a source MAC address, a source IP address, a destination MAC address, and a destination IP address, from contents in communication between a server and a client terminal according to a protocol for dynamically assigning the IP address, and
   wherein, in a case where the protocol information table is searched based on the extracted source IP address, and the MAC address corresponding to the source IP address stored in the protocol information table matches the extracted source MAC address, and
   in a case where the protocol information table is searched based on the extracted destination IP address, and the MAC address corresponding to the destination IP address stored in the protocol information table matches the extracted destination MAC address,
   the processor transmits a signal from permitting generation of the whitelist.

8. The communication apparatus according to claim 7, wherein the processor performs generation of the whitelist, in a case where the signal for permitting generation of the whitelist is received.

9. The communication apparatus according to claim 8, wherein the processor does not perform generation of the whitelist, in a case where a signal for permitting generation of the whitelist is not received.

10. The communication apparatus according to claim 7, further comprising:
    a control unit that generates the protocol information table from contents in communication according to the protocol exchanged between the server and the client terminal.

11. The communication apparatus according to claim 7, wherein, once the packet is received in a whitelist generation state in which generation of the whitelist is performed, the processor generates the whitelist and writes the whitelist into the whitelist storage memory, in a case where the generation of the whitelist is permitted.

12. The communication apparatus according to claim 11, wherein the processor performs update of the whitelist stored in the whitelist storage memory, in a case where the protocol information table is updated in the whitelist generation state in which generation of the whitelist is performed.

13. A communication system, comprising:
    a communication apparatus for relaying a packet received according to a whitelist including a MAC address and an IP address, the communication apparatus comprising:

a protocol information table that stores the MAC address and the IP address in association with each other;
a whitelist storage memory that stores the whitelist; and
a processor configured to:
  generate the whitelist;
  determine whether or not generation of the whitelist is possible,
  wherein the processor extracts a source MAC address, a source IP address, a destination MAC address, and a destination IP address, from contents in communication between a server and a client terminal according to a protocol for dynamically assigning the IP address, and
  wherein, in a case where the protocol information table is searched based on the extracted source MAC address, and the IP address corresponding to the source MAC address stored in the protocol information table matches the extracted source IP address, and
  in case where the protocol information table is searched based on the extracted destination MAC address, and the IP address corresponding to the destination MAC address stored in the protocol information table matches the extracted destination IP address,
  the processor transmits a signal for permitting generation of the whitelist; and
the server that performs dynamic assignment of the IP address to the client terminal.

* * * * *